United States Patent
Takahashi et al.

(10) Patent No.: US 12,384,054 B2
(45) Date of Patent: Aug. 12, 2025

(54) VACUUM GRIPPER AND WORKPIECE SUCKING AND HOLDING METHOD

(71) Applicant: AMADA CO., LTD., Kanagawa (JP)

(72) Inventors: Yuuki Takahashi, Kanagawa (JP); Masataka Ishida, Kanagawa (JP); Hiroshi Iwanaga, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 912 days.

(21) Appl. No.: 17/618,521

(22) PCT Filed: Jun. 12, 2020

(86) PCT No.: PCT/JP2020/023135
§ 371 (c)(1),
(2) Date: Dec. 13, 2021

(87) PCT Pub. No.: WO2020/255869
PCT Pub. Date: Dec. 24, 2020

(65) Prior Publication Data
US 2022/0241988 A1    Aug. 4, 2022

(30) Foreign Application Priority Data
Jun. 21, 2019  (JP) .................. 2019-115153

(51) Int. Cl.
*B25J 15/06*     (2006.01)
*B65G 47/91*     (2006.01)
(52) U.S. Cl.
CPC ........ *B25J 15/0616* (2013.01); *B65G 47/917* (2013.01)

(58) Field of Classification Search
CPC . B25J 15/0616; B25J 15/0061; B65G 47/917; B65G 59/04; B65H 2406/343;
(Continued)

(56) References Cited

U.S. PATENT DOCUMENTS 6,652,014 B2 * 11/2003 Schmalz ............. B25J 15/0616
414/737
8,162,362 B2 *  4/2012 Braunschweiger .... B65G 61/00
414/797
(Continued)

FOREIGN PATENT DOCUMENTS

| JP | 2002-211707 A  |   | 7/2002 |
| JP | 2002211776 A   | * | 7/2002 |
| JP | 2013-107080 A  |   | 6/2013 |

OTHER PUBLICATIONS

International Search Report for corresponding Application No. PCT/JP2020/023135, mailed Sep. 8, 2020.
(Continued)

*Primary Examiner* — Stephen A Vu
(74) *Attorney, Agent, or Firm* — Renner, Otto, Boisselle & Sklar, LLP

(57) ABSTRACT

A plurality of first vacuum pads for suctioning a workpiece are directly or indirectly attached to a main body. A slider is configured to slide in an outward direction of the main body. When the slider slides to protrude in the outward direction of the main body while the first vacuum pads are suctioning the workpiece, a sensor detects an end portion of the workpiece. While the sensor detects the end portion of the workpiece and the slider is stopped, a second vacuum pad holds up the end portion of the workpiece by suctioning the workpiece at a position outside from positions at which the first vacuum pads suction the workpiece.

4 Claims, 8 Drawing Sheets

(58) Field of Classification Search
CPC ............ B65H 2701/173; B65H 3/0816; B65H 3/0883; B21D 43/18
See application file for complete search history.

(56) References Cited

U.S. PATENT DOCUMENTS

| | | | | |
|---|---|---|---|---|
| 8,473,094 | B2 * | 6/2013 | Becker | B65G 47/918 414/796 |
| 9,498,887 | B1 | 11/2016 | Zevenbergen et al. | |
| 2007/0280812 | A1 * | 12/2007 | Morency | B65G 61/00 414/729 |
| 2011/0268548 | A1 * | 11/2011 | Doll | B25J 15/00 414/688 |

OTHER PUBLICATIONS

Written Opinion for corresponding Application No. PCT/JP2020/023135, mailed Sep. 8, 2020.
Extended European Search Report for corresponding EP Application No. 20826604.9 issued Jul. 18, 2022.

* cited by examiner

VACUUM GRIPPER AND WORKPIECE SUCKING AND HOLDING METHOD

TECHNICAL FIELD

The present disclosure relates to a vacuum gripper and a workpiece sucking and holding method.

BACKGROUND ART

Patent Literature 1 describes an automatic bending system in which a workpiece is automatically bent by cooperation between a press brake and a bending robot. The bending robot holds the workpiece and transports the workpiece to the press brake. The press brake sandwiches the workpiece between a punch and a die, and bends the workpiece when the bending robot that holds the workpiece moves.

Typically, the bending robot transports the workpiece by sucking the workpiece with a vacuum gripper that includes a vacuum pad (see Patent Literature 1 or 2).

CITATION LIST

Patent Literature

Patent Literature 1: Japanese Patent Application Laid-Open Publication No. 2013-107080
Patent Literature 2: Japanese Patent Application Laid-Open Publication No. 2002-211707

SUMMARY

It is necessary for the vacuum gripper to hold and transport only one uppermost workpiece among a plurality of workpieces stacked and arranged at a mounting place. Conventionally, a magnet floater is provided at the mounting place in such a manner as to face the end faces of the plurality of stacked workpieces. Since the magnet floater separates the vertically adjacent workpieces by forming a gap therebetween, the vacuum gripper can hold and transport only the one uppermost workpiece.

When the magnet floater is used, however, there is a problem that the workpiece may be magnetized. Further, although the magnet floater can separate magnetic workpieces, the magnet floater cannot separate non-magnetic workpieces such as an aluminum plate or an austenitic stainless steel. In addition, in order to separate the workpieces by using the magnet floater, it is necessary to stack the plurality of workpieces at the mounting place with the end faces thereof aligned to face the reference plane.

In recent years, a bending robot has appeared in which workpieces arranged at a mounting place are photographed with a camera to detect the position at which the workpieces are arranged so that a vacuum gripper holds and transports one uppermost workpiece. In this case, since it is not necessary to arrange a plurality of workpieces at the mounting place in alignment, the plurality of workpieces may be randomly arranged. Accordingly, this makes it impossible to use the magnet floater to separate the workpieces.

An object of one or more embodiments is to provide a vacuum gripper and a workpiece sucking and holding method capable of sucking and holding one uppermost workpiece among a plurality of stacked workpieces.

According to a first aspect of the one or more embodiments, there is provided a vacuum gripper including a main body, a plurality of first vacuum pads attached directly or indirectly to the main body and configured to suction a workpiece, a slider configured to slide in an outward direction of the main body, a sensor attached to the slider and configured to detect an end portion of the workpiece when the slider slides to protrude in the outward direction of the main body while the first vacuum pads are suctioning, the workpiece, and a second vacuum pad attached to the slider and configured to hold up the end portion of the workpiece by suctioning the workpiece at a position outside from positions at which the first vacuum pads suction the workpiece while the sensor detects the end portion of the workpiece and the slider is stopped.

According to a second aspect of the one or more embodiments, there is provided a workpiece sucking and holding method including suctioning, by a plurality of first vacuum pads attached directly or indirectly to a main body, an uppermost workpiece among a plurality of stacked workpieces, sliding a slider configured to slide in an outward direction of the main body so as to protrude in the outward direction of the main body, stopping the slider when a sensor attached to the slider and configured to detect an end portion of the workpiece detects an end portion of the uppermost workpiece, holding up, by a second vacuum pad attached to the slider, the end portion of the workpiece by suctioning the uppermost workpiece at a position outside from positions at which the first vacuum pads suction the workpiece, and stopping suction of the workpiece by the second vacuum pad and suctioning and holding the uppermost workpiece with the first vacuum pads.

According to the vacuum gripper and the workpiece sucking and holding method of the one or more embodiments, it is possible to suck and hold one uppermost workpiece among the plurality of stacked workpieces.

DESCRIPTION OF EMBODIMENTS

Hereinafter, the vacuum gripper and the workpiece sucking and holding method according to the one or more embodiments will be described with reference to the attached drawings.

Figure 1:
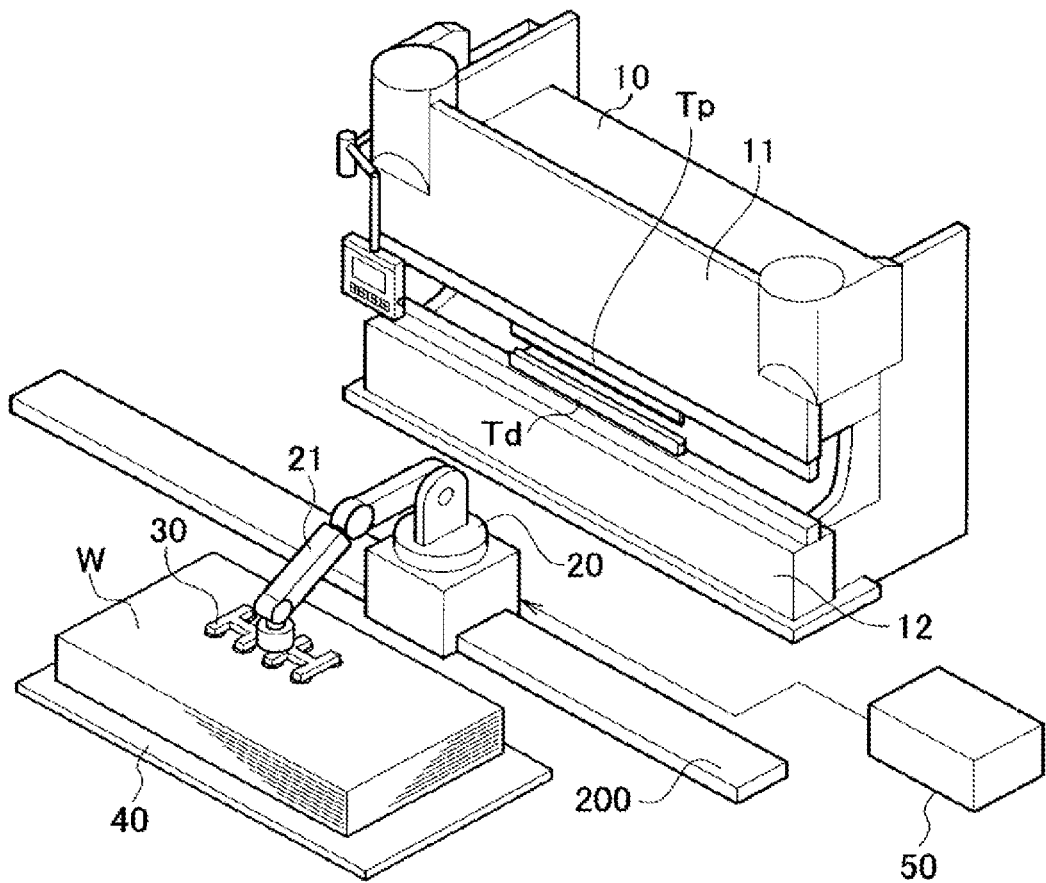
FIG. 1 is a perspective view showing a schematic configuration example of an automatic bending system provided with a press brake and a bending robot.

First, a schematic configuration example of an automatic bending system provided with a press brake and a bending robot will be described by using FIG. 1. As shown in FIG. 1, the automatic bending system is provided with a press brake 10 and a bending robot 20. The press brake 10 includes an upper table 11 that can vertically move and a lower table 12 that is fixed. A punch Tp, which is an upper tool, is mounted on the upper table 11, and a die. Td, which is a lower tool, is mounted on the lower table 12.

The bending robot 20 is arranged on a guide rail 200, and is configured to be movable in the left-right direction of the press brake 10 along the guide rail 200. A vacuum gripper 30 for sucking and holding a workpiece W is attached to the distal end of an arm 21. The vacuum gripper 30 is configured to be able to be installed at and removed from the distal end of the arm 21.

As an example of a mounting place, a pallet 40 is arranged in front of the bending robot 20. A plurality of the workpiece W are stacked and arranged on the pallet 40. The workpiece W is a sheet metal such as a stainless steel, a mild steel, or an aluminum plate.

As will be described later, the vacuum gripper 30 sucks and holds one uppermost workpiece W and transports the uppermost workpiece W between the punch Tp and the die Td. The press brake 10 lowers the upper table 11 to sandwich the workpiece W between the punch Tp and the die Td, and bends the workpiece W when the bending robot 20 moves the articulated arm 21. An unillustrated camera may detect the position of the workpiece W on the pallet 40 so that the bending robot 20 positions the vacuum gripper 30 above the workpiece W.

A control device 50 controls movements of the bending robot 20 and the vacuum gripper 30. The control device 50 may be a control device (an NC device) for controlling the press brake 10. When the control device for controlling the press brake 10 is provided separately from the control device 50, the control device 50 controls the movements of the bending robot 20 and the vacuum gripper 30 in collaboration with the control device for controlling the press brake 10.

Next, the specific configuration of the vacuum gripper 30 will be described with reference to FIGS. 2 to 4, and how the vacuum gripper 30 sucks the one uppermost workpiece W among the plurality of workpieces W will be described by using FIGS. 5 to 8.

Figure 2:
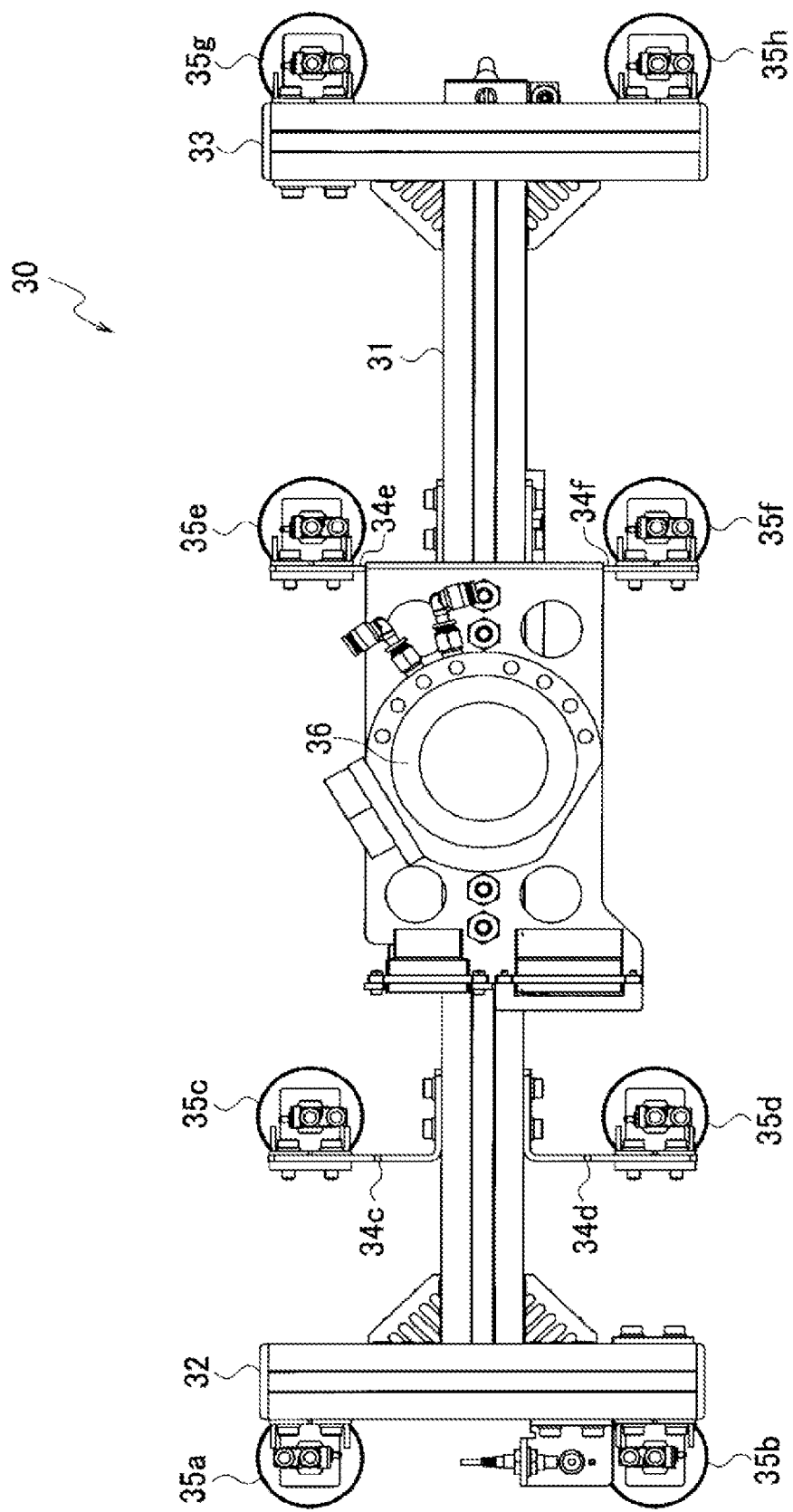
FIG. 2 is a top view showing a vacuum gripper of one or more embodiments.
Figure 3:
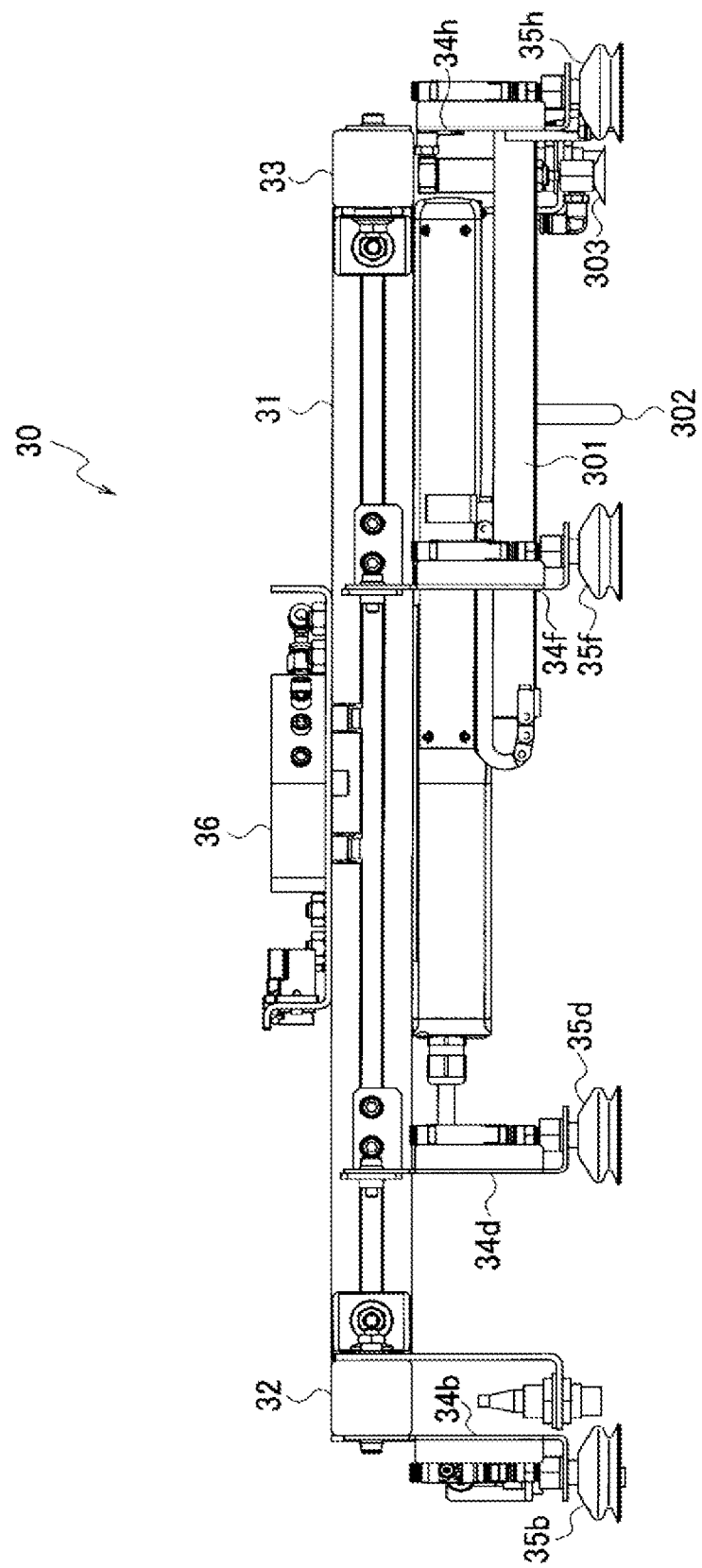
FIG. 3 is a side view showing the vacuum gripper of the one or more embodiments.
Figure 4:
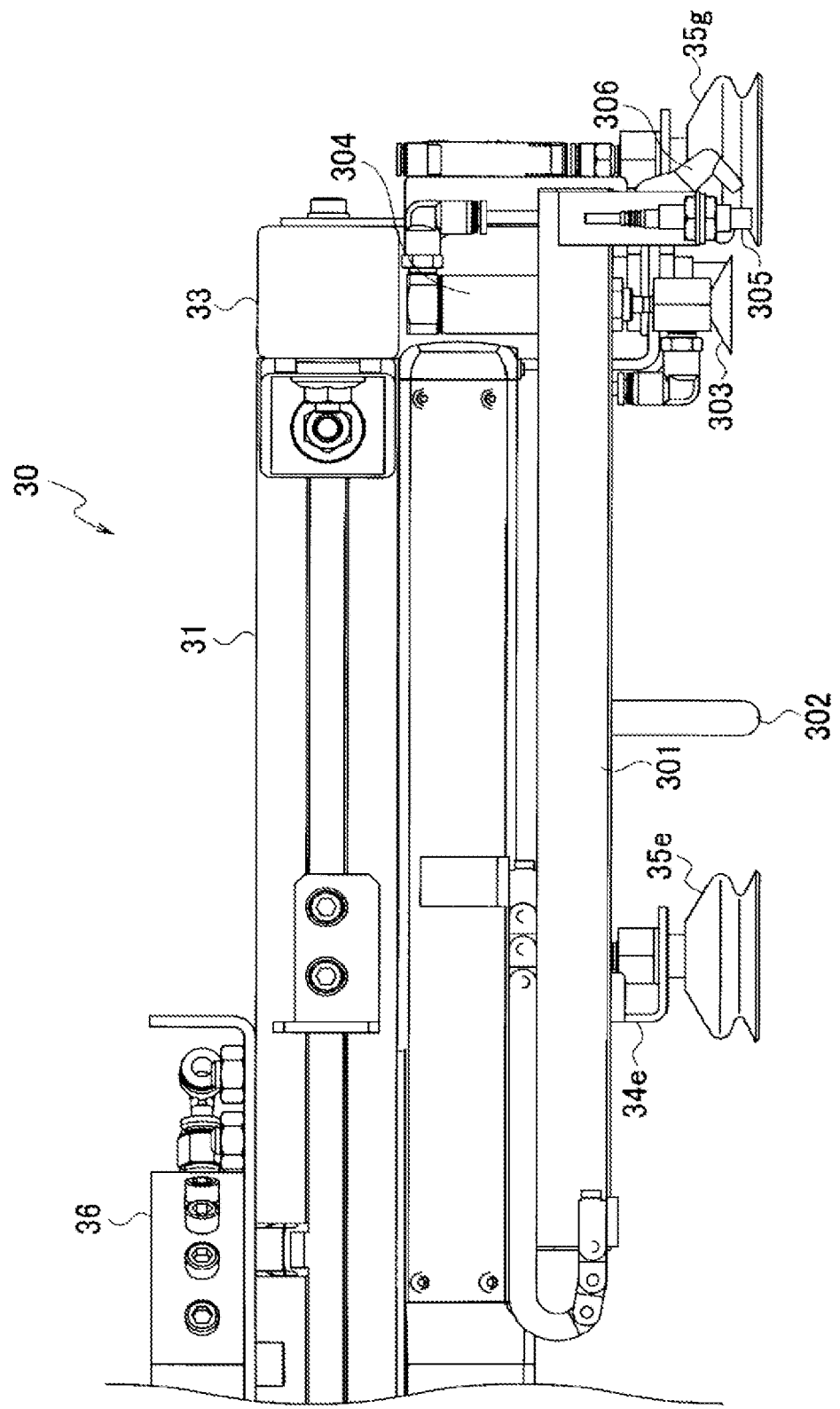
FIG. 4 is a partially enlarged side view showing the vacuum gripper of the one or more embodiments.

FIGS. 2 to 4 each shows a state in which the vacuum gripper 30 is removed from the distal end of the arm 21 of the bending robot 20. As shown in FIG. 2 or 3, the vacuum gripper 30 is provided with a support column 31 in a quadrangular prism shape. Support columns 32 and 33 each in a quadrangular prism shape, which are orthogonal to the longitudinal direction of the support column 31, are attached to the both end portions of the support column 31 in the longitudinal direction. The support columns 31, 32, and 33 form the main body of the vacuum gripper 30. The planar shape of the main body is not limited to the shape shown in FIG. 2, and may be a rectangular shape.

Brackets are attached to the both end portions of the support column 32 in the longitudinal direction. A vacuum pad 35a is attached to one bracket, and a vacuum pad 35b is attached to a bracket 34b shown in FIG. 3, which is the other bracket. Brackets 34c and 34d, and 34e and 34f, which respectively face each other with the support column 31 interposed therebetween, are attached to the support column 31. Vacuum pads 35c, 35d, 35e, and 35f are attached to the brackets 34c, 34d, 34e, and 34f, respectively.

Brackets are attached to the both end portions of the support column 33 in the longitudinal direction. A vacuum pad 35g is attached to one bracket, and a vacuum pad 35h is attached to a bracket 34h shown in FIG. 3, which is the other bracket. A connector 36 for connecting to the distal end of the arm 21 is arranged at the center of the support column 31.

Although not illustrated, a tube for suctioning the workpiece W is piped to the vacuum pads 35a to 35h, respectively. The vacuum pads 35a to 35h are defined as first vacuum pads. It should be noted that the first vacuum pads only need to be directly or indirectly attached to the main body, and are not limited to a configuration in which the vacuum pads are attached via the brackets. The number of the first vacuum pads is not limited to eight, and may be any plurality.

As shown in FIG. 3, an electric slider 301 that slides in the longitudinal direction of the support column 31 is attached below the support column 31. A slider that slides with air may be used instead of the electric slider 301, and the slider is not limited to the electric slider. FIG. 4 shows a state in which the brackets 34d and 34f as well as the vacuum pads 35d and 35f are omitted so that the configuration attached to the electric slider 301 can be easily visually recognized.

As shown in FIG. 3 or 4, the electric slider 301 is provided with a pressing unit 302 that protrudes downward, a vacuum pad 303 for holding up the uppermost workpiece W, an air cylinder 304 for moving the vacuum pad 303 up and down, a proximity sensor 305, and an air nozzle 306. The vacuum pad 303 is defined as a second vacuum pad. Instead of using the air cylinder 304, the vacuum pad 303 may be electrically moved up and down.

Though it is not mandatory to provide the air nozzle 306, it is preferable to provide the air nozzle 306. The vacuum pad 303 has a smaller diameter than those of the vacuum pads 35a to 35h, but may have the same diameter as those of the vacuum pads 35a to 35h. Although not illustrated, a tube for suctioning the workpiece W is piped to the vacuum pad 303.

Figure 5:
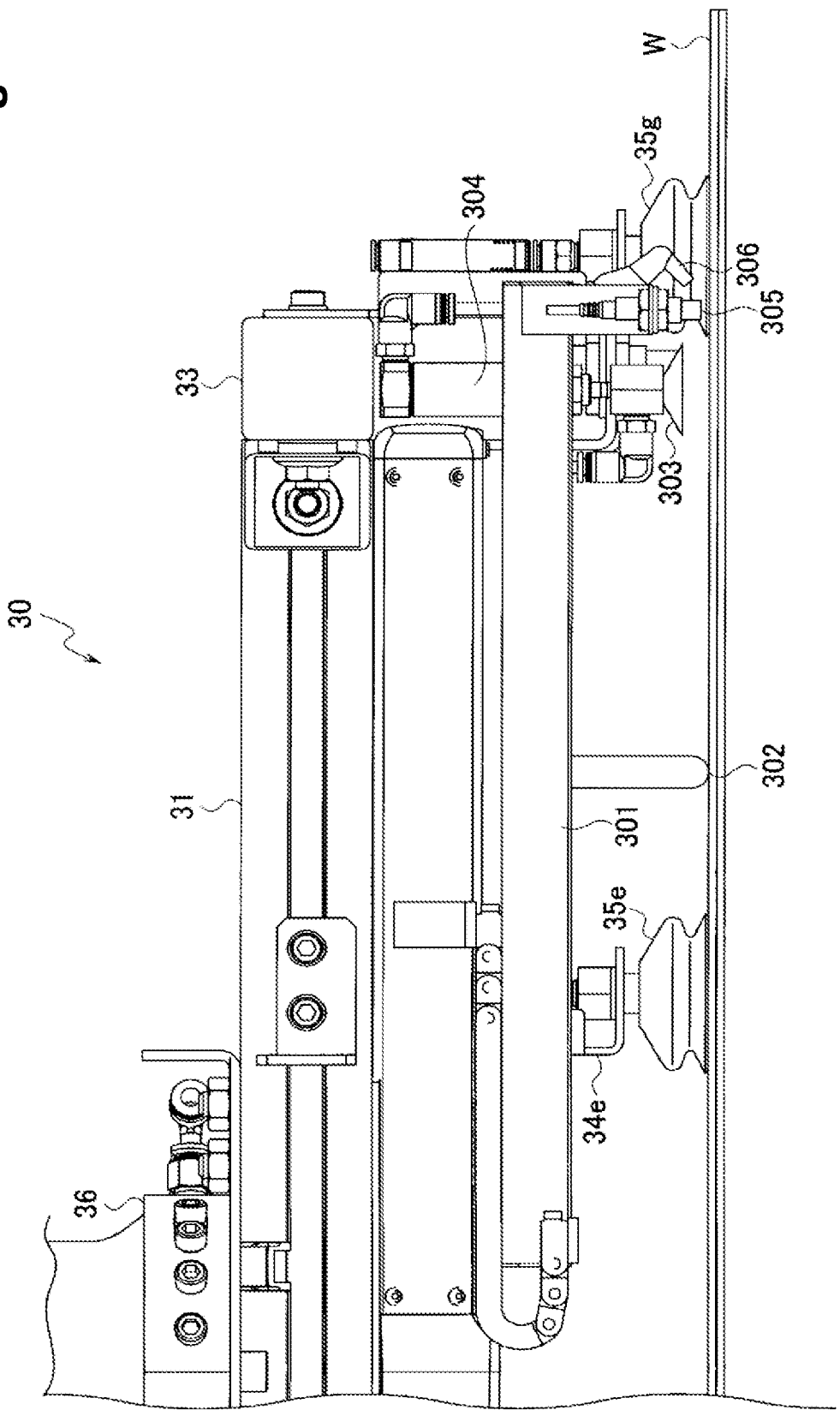
FIG. 5 is a partially enlarged side view showing a state in which the vacuum gripper of the one or more embodiments is suctioning the uppermost workpiece.

The vacuum gripper 30 configured as described above sucks and holds the one uppermost workpiece W among the plurality of workpieces W in a manner described below. The control device 50 moves the bending robot 20 so that the vacuum gripper 30 is positioned above the workpiece W. The bending robot 20 may move along the guide rail 200, or only the arm 21 may move. As shown in FIG. 5, the control device 50 moves the arm 21 so as to lower the vacuum gripper 30, brings the vacuum pads 35a to 35h into contact with the uppermost workpiece W to suction the uppermost workpiece W.

Depending on the size or the shape of the workpiece W, only a part of the vacuum pads 35a to 35h may suction the workpiece W.

By way of example, the proximity sensor 305 detects whether or not the proximity sensor 305 faces the workpiece W on the basis of a capacitance value. In the state of FIG. 5, since the proximity sensor 305 is in close proximity to the workpiece W, the proximity sensor 305 is turned on at the timing at which the vacuum pads 35a to 35h start suctioning the uppermost workpiece W, or before or after that timing. It should be noted that the vacuum pad 303 is located above and is not in contact with the uppermost workpiece W. The distal end of the pressing unit 302 is in contact with or in close proximity to the uppermost workpiece W.

Figure 6:
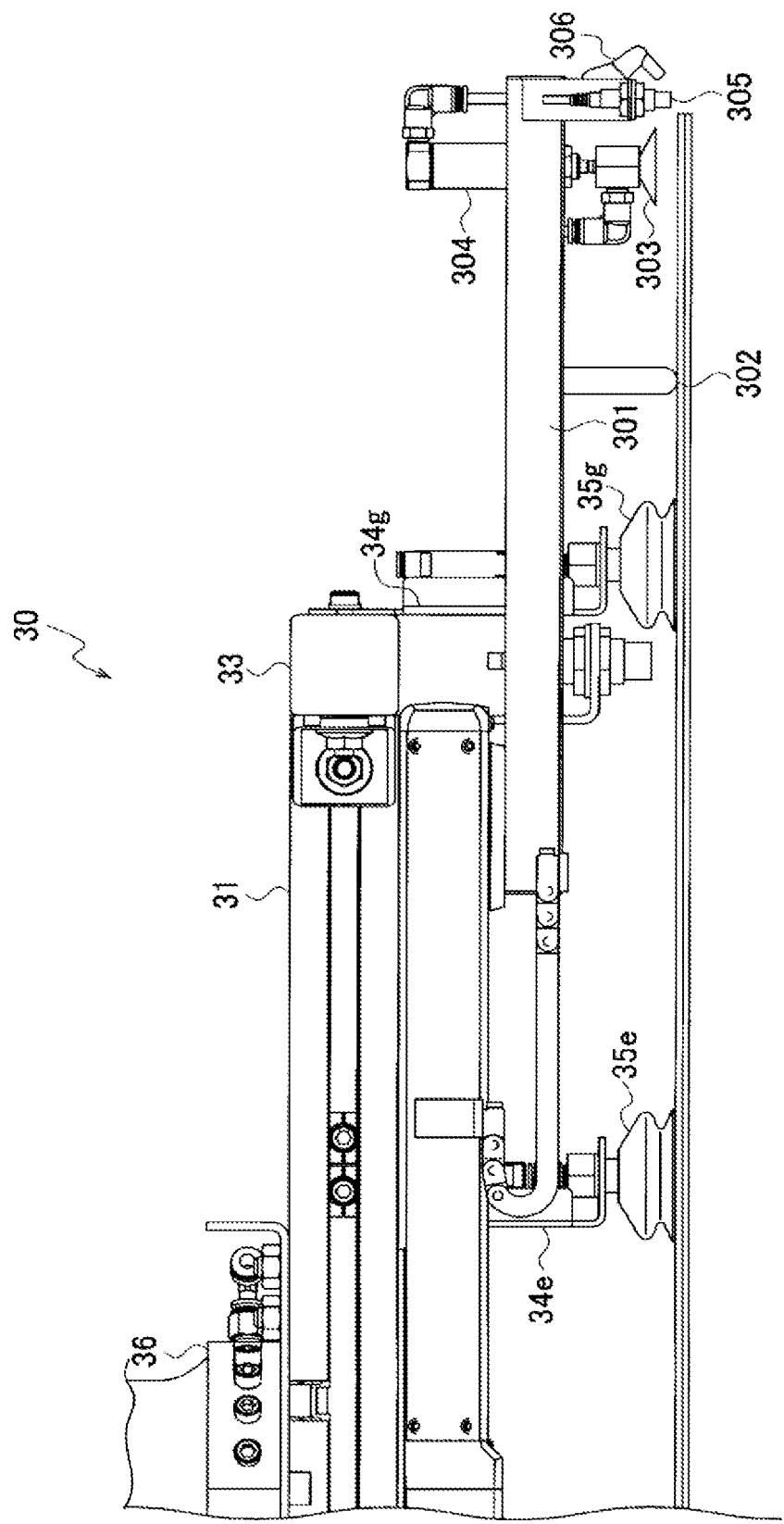
FIG. 6 is a partially enlarged side view showing a state in which an electric slider is slid while the vacuum gripper of the one or more embodiments is suctioning the uppermost workpiece.

As shown in FIG. 6, the control device 50 slides the electric slider 301 so that the electric slider 301 protrudes in the outward direction of the vacuum gripper 30. The control device 50 may slide the electric slider 301 after a predetermined time has passed since the vacuum pads 35a to 35h started suctioning the uppermost workpiece W.

When the electric slider 301 slides in the outward direction, the state of the proximity sensor 305 is changed to a state in which the proximity sensor 305 is displaced from an end portion of the workpiece W and no longer faces the workpiece W, as shown in FIG. 6. As a result, the proximity sensor 305 is turned off. In this manner, the end portion of the workpiece W can be detected by the timing at which the state of the proximity sensor 305 changes from an on state to an off state. The control device 50 stops the sliding of the electric slider 301 at the timing when the proximity sensor 305 is turned off.

Figure 7:
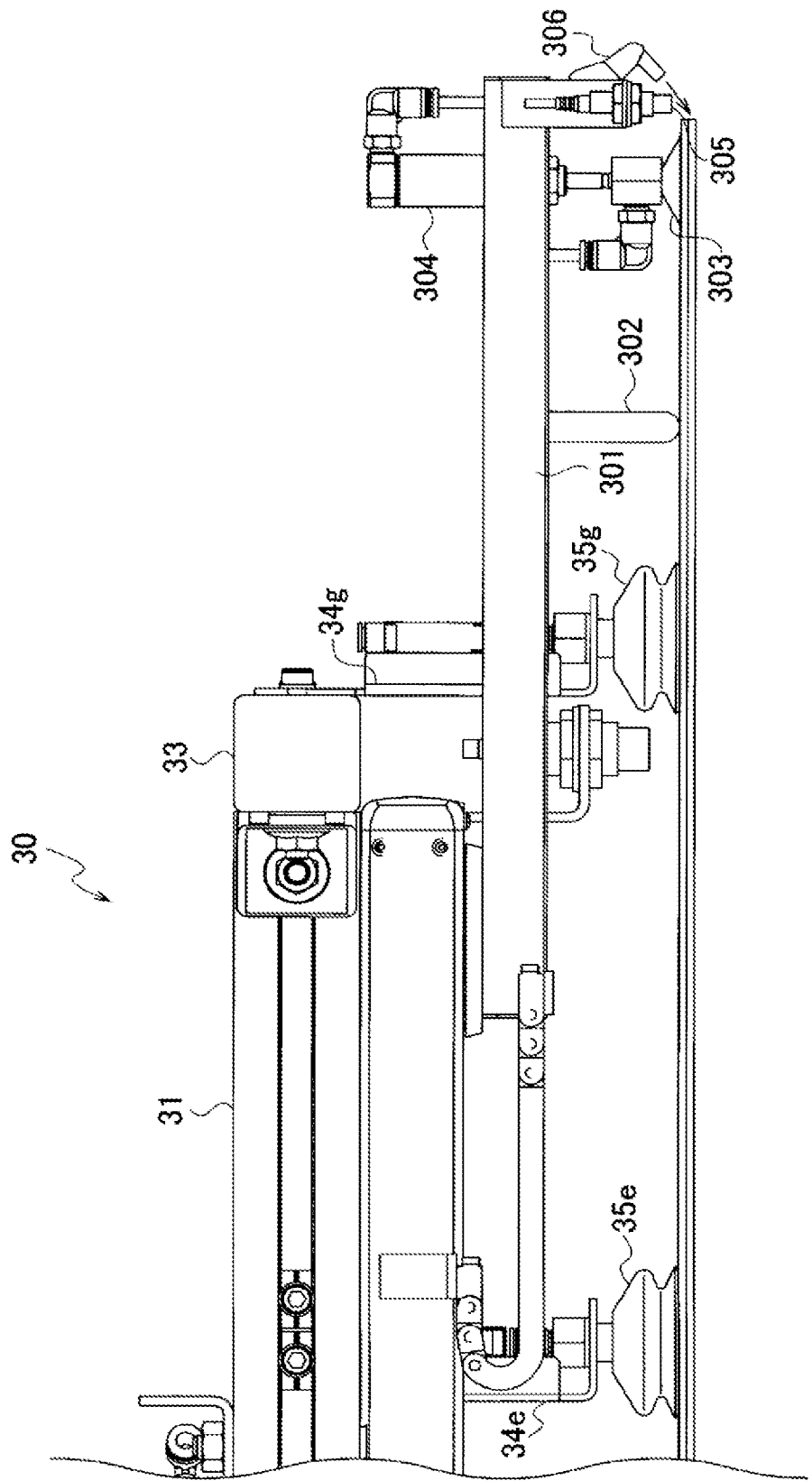
FIG. 7 is a partially enlarged side view showing a state in which a vacuum pad for holding up the uppermost workpiece is suctioning an end portion of the uppermost workpiece while the vacuum gripper of the one or more embodiments stops the sliding of the electric slider.

As shown in FIG. 7, after stopping the sliding of the electric slider 301, the control device 50 causes the air cylinder 304 to lower the vacuum pad 303 and bring the vacuum pad 303 into contact with the uppermost workpiece W, and causes the vacuum pad 303 to suction the workpiece W. At the same time, the control device 50 ejects air from the air nozzle 306 to blow the air at the end portion of the workpiece W.

Figure 8:
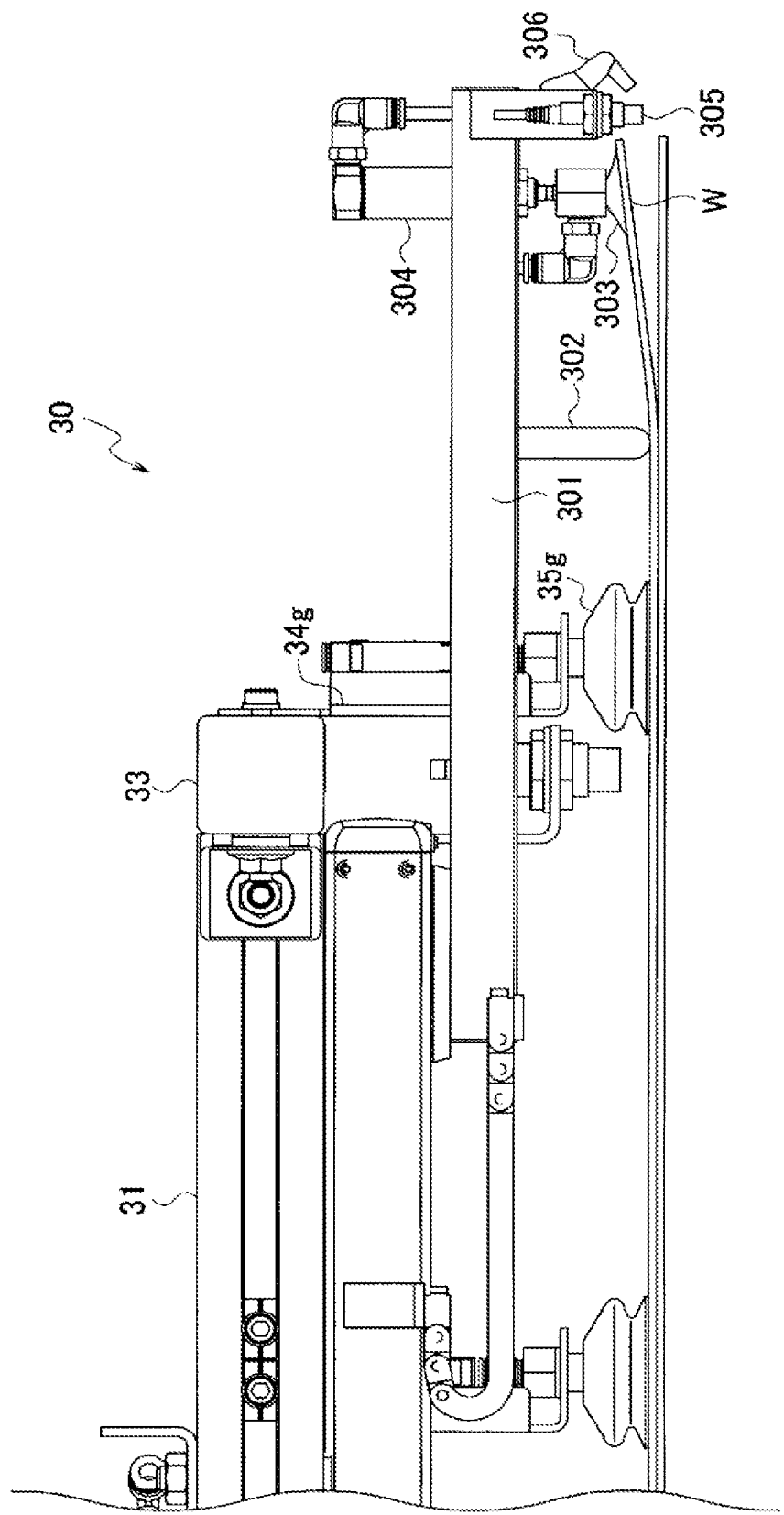
FIG. 8 is a partially enlarged side view showing a state in which the vacuum pad for holding up the uppermost workpiece holds up the end portion of the uppermost workpiece, following the state shown in FIG. 7.

After causing the vacuum pad 303 to suction the uppermost workpiece W, the control device 50 causes the air cylinder 304 to raise the vacuum pad 303. Then, as shown in FIG. 8, the end portion of the uppermost workpiece W is held up at a position outside from positions at which the vacuum pads 35a to 35h suction the workpiece W. Since the pressing unit 302 is in contact with or in close proximity to the uppermost workpiece W, an end portion, which is outside from the pressing unit 302, of the uppermost workpiece is held up.

After that, the control device 50 causes the vacuum pad 303 to stop suctioning and causes the air nozzle 306 to stop ejecting the air. When the end portion of the workpiece W is held up by the vacuum pad 303, blowing air at the end portion of the workpiece W is not mandatory. Subsequently, the control device 50 moves the arm 21 to hold up the uppermost workpiece W, which is sucked to the vacuum pads 35a to 35h, and to transport the uppermost workpiece W to the press brake 10.

As described above, according to the vacuum gripper and the workpiece sucking and holding method of the one or more embodiments, it is not necessary to use the magnet floater, and the one uppermost workpiece W among the plurality of stacked workpieces W can be sucked and held by the configuration provided in the vacuum gripper.

According to the vacuum gripper and the workpiece sucking and holding method of the one or more embodiments, the problem that the workpiece W is magnetized does not occur. According to the vacuum gripper and the workpiece sucking and holding method of the one or more embodiments, even when the workpiece W is non-magnetic, the one uppermost workpiece W can be sucked and held. According to the vacuum gripper and the workpiece sucking and holding method of the one or more embodiments, it is not necessary to stack the plurality of workpieces W at the mounting place with the end faces thereof aligned to face the reference plane.

The present invention is not limited to the one or more embodiments described above, and various modifications can be made without departing from the gist of the present invention. In the one or more embodiments, the proximity sensor 305 is used as a sensor for detecting the end portion of the workpiece W. Instead of the proximity sensor 305, however, any sensor may be used such as a sensor using a sound wave, a sensor using a laser length measuring device, and a photoelectric sensor.

It is preferable that the timing at which the vacuum pad 303 is raised by the air cylinder 304 to hold up the end portion of the uppermost workpiece W coincides with the timing at which the air is ejected from the air nozzle 306. However, the ejection of the air may be started before the end portion of the workpiece W is held up, or the ejection of the air may be started after the end portion of the workpiece W is held up. It is only necessary to blow air to the end portion of the workpiece W while the end portion of the workpiece W is being held up.

In the one or more embodiments, the vacuum gripper 30 mounted on the bending robot 20 is taken as an example, but the configuration of the one or more embodiments can also be adopted to a vacuum gripper mounted on a transfer robot other than the bending robot 20.

The present application claims priority based on Japanese Patent Application No. 2019-115153 filed with the Japan Patent Office on Jun. 21, 2019, and all disclosures thereof are incorporated herein by reference.

The invention claimed is:

1. A vacuum gripper, comprising:
   a main body;
   a plurality of first vacuum pads attached directly or indirectly to the main body and configured to suction an uppermost workpiece among a plurality of stacked workpieces in a state in which the first vacuum pads make contact with positions on a surface of the uppermost workpiece;
   a slider configured to slide in an outward direction of the main body;
   a sensor attached to the slider and configured to detect an end portion of the uppermost workpiece when the slider slides to protrude in the outward direction of the main body while the first vacuum pads are suctioning the uppermost workpiece; and
   a second vacuum pad attached to the slider and configured to hold up the end portion of the uppermost workpiece by suctioning the uppermost workpiece in a state in which the second vacuum pad makes contact with a position outside the positions at which the first vacuum pads make contact on the surface of the uppermost workpiece while the sensor detects the end portion of the uppermost workpiece and the slider is stopped.

2. The vacuum gripper according to claim 1, further comprising an air nozzle configured to blow air to the end portion of the uppermost workpiece while the second vacuum pad is holding up the end portion of the uppermost workpiece.

3. A workpiece sucking and holding method, comprising:
   suctioning, by a plurality of first vacuum pads attached directly or indirectly to a main body, an uppermost workpiece among a plurality of stacked workpieces in a state in which the first vacuum pads make contact with positions on a surface of the uppermost workpiece;
   sliding a slider configured to slide in an outward direction of the main body so as to protrude in the outward direction of the main body;
   stopping the slider when a sensor attached to the slider and configured to detect an end portion of the uppermost workpiece detects an end portion of the uppermost workpiece;
   holding up, by a second vacuum pad attached to the slider, the end portion of the uppermost workpiece by suctioning the uppermost workpiece in a state in which the second vacuum pad makes contact with a position outside the positions at which the first vacuum pads make contact on the surface of the uppermost workpiece; and stopping suction of the workpiece by the second vacuum pad and suctioning and holding the uppermost workpiece with the first vacuum pads.

4. The workpiece sucking and holding method according to claim 3, further comprising blowing, by an air nozzle, air to the end portion of the uppermost workpiece while the second vacuum pad is holding up the end portion of the uppermost workpiece.

\* \* \* \* \*